United States Patent
Serkh et al.

(10) Patent No.: US 7,004,863 B2
(45) Date of Patent: Feb. 28, 2006

(54) DAMPING MECHANISM

(75) Inventors: Alexander Serkh, Troy, MI (US); Litang Gao, Shelby Township, MI (US); Zoran Jevtic, Farmington Hills, MI (US); Minchun Hao, Windsor (CA)

(73) Assignee: The Gates Corporation, Denver, CO (US)

( * ) Notice: Subject to any disclaimer, the term of this patent is extended or adjusted under 35 U.S.C. 154(b) by 81 days.

(21) Appl. No.: 10/147,183

(22) Filed: May 15, 2002

(65) Prior Publication Data

US 2003/0216204 A1 Nov. 20, 2003

(51) Int. Cl.
*F16H 7/12* (2006.01)
(52) U.S. Cl. ..................... 474/109; 474/133
(58) Field of Classification Search ............... 474/101, 474/109, 111, 112, 133, 135
See application file for complete search history.

(56) References Cited

U.S. PATENT DOCUMENTS

| | | | |
|---|---|---|---|
| 1,645,576 A | 10/1927 | Beconnier | |
| 4,696,663 A * | 9/1987 | Thomey et al. | 474/133 |
| 5,354,242 A * | 10/1994 | St. John | 474/135 |
| 5,632,697 A | 5/1997 | Serkh | 474/109 |
| 5,647,813 A | 7/1997 | Serkh | 474/135 |
| 5,964,674 A * | 10/1999 | Serkh et al. | 474/109 |
| 6,497,632 B1 * | 12/2002 | Ayukawa et al. | 474/135 |
| 6,609,988 B1 * | 8/2003 | Liu et al. | 474/133 |
| 2002/0010045 A1 | 1/2002 | Serkh | 474/135 |
| 2003/0119616 A1 * | 6/2003 | Meckstroth et al. | 474/135 |

FOREIGN PATENT DOCUMENTS

| | | |
|---|---|---|
| DE | 40 29 940 A1 | 3/1992 |
| DE | 196 47 224 A1 | 5/1997 |
| EP | 0 636 815 A1 | 7/1994 |

* cited by examiner

*Primary Examiner*—Vicky A. Johnson
(74) *Attorney, Agent, or Firm*—J. A. Thurnau; C. H. Castleman; S. G. Austin

(57) ABSTRACT

An asymmetric damping mechanism for use in a belt tensioner. The damping mechanism comprises two parts having substantially similar arcuate shapes for engaging a tensioner. The first part is in contact with the second part at a pivotable point of contact. The point of contact position is determined according to the desired asymmetric damping factor. The first part is also in contact with a spring. The second part is in contact with a tensioner arm. The damping mechanism also comprises two damping shoes, each having a damping band. The damping band is joined to the damping shoe by a plurality of vertical grooves on the damping shoe cooperating with a plurality of grooves on the damping band. The damping mechanism has an asymmetric damping factor in the range of approximately 1.5 to 5.

9 Claims, 10 Drawing Sheets

DAMPING MECHANISM

FIELD OF THE INVENTION

The invention relates to a damping mechanism, and more particularly, to an asymmetric damping mechanism for a tensioner.

BACKGROUND OF THE INVENTION

Belt tensioners are used to impart a load on a belt. Typically the belt is used in an engine application for driving various accessories associated with the engine. For example, an air conditioning compressor and alternator are two of the accessories that may be driven by a belt drive system.

A belt tensioner comprises a pulley journaled to an arm. A spring is connected between the arm and a base. The spring may also engage a damping mechanism. The damping mechanism comprises frictional surfaces in contact with each other. The damping mechanism damps an oscillatory movement of the arm caused by operation of the belt drive. This in turn enhances a belt life expectancy.

Representative of the art is U.S. Pat. No. 5,632,697 to Serkh (1997) which discloses a spring activated damping mechanism which provide a normal force greater than a spring force applied to a brake shoe that engages a cylindrical member.

Reference is also made to co-pending U.S. patent application Ser. No. 09/861,338 filed May 18, 2001 which discloses a tensioner having a damping mechanism.

Reference is also made to co-pending U.S. patent application Ser. No. 09/864,536 filed 24, May 2001 which discloses an asymmetric damping tensioner belt drive system.

What is needed is a damping mechanism having an asymmetric damping factor in the range of approximately 1.5 to 5.0. What is needed is a tensioner having a damping mechanism comprising two members having a pivotal connection. The present invention meets these needs.

SUMMARY OF THE INVENTION

The primary aspect of the present invention is to provide a damping mechanism having an asymmetric damping factor in the range of 1.5 to 5.0.

Another aspect of the invention is to provide a tensioner having a damping mechanism comprising two members having a pivotal connection.

Other aspects of the invention will be pointed out or made apparent by the following description of the invention and the accompanying drawings.

DESCRIPTION OF THE INVENTION

Figure 1:
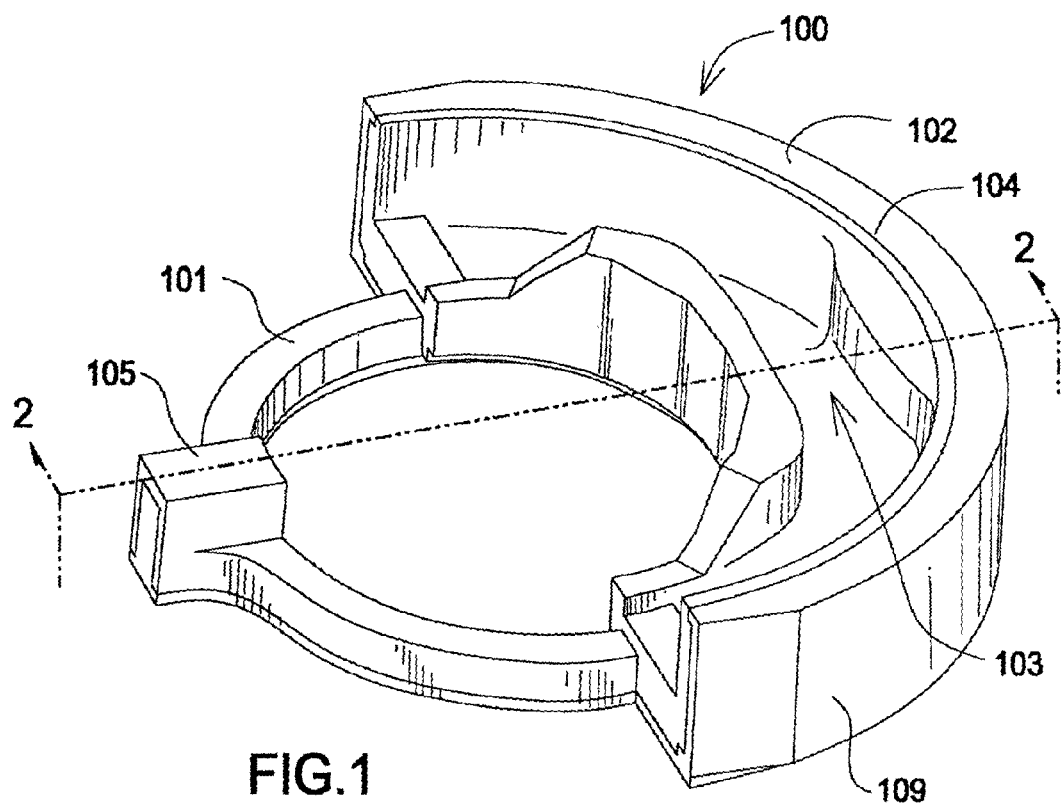
FIG. 1 is a top perspective view of an inventive damping mechanism.

FIG. 1 is a top perspective view of an inventive damping mechanism. The inventive damping mechanism is utilized in a belt tensioner, see FIG. 17. The belt tensioner engages a belt through a pulley journaled to a lever arm. The tensioner is used to apply a preload to the belt and to damp oscillatory movements of the belt.

The damping mechanism damps oscillatory movements of a tensioner lever arm. The lever arm generally experiences a bi-directional or oscillatory motion caused by changes in the operating status of a belt drive, for example by load changes. Damping is necessary to remove energy from the belt system, thereby ensuring proper operation of the tensioner in order to maximize belt life and operational efficiency.

More particularly, an inventive damping mechanism is shown in FIG. 1. Damping mechanism 100 comprises damping band 102. Damping band 102 is connected to an outer arcuate surface 104 of damping shoe 101. Spring, or biasing member, receiving portion 103 comprises a slot in damping shoe 101. Receiving portion 103 receives an end tang (not shown, see 500 in FIG. 15) of a coil spring. Surface 105 engages a coil of a spring to provide support during operation.

Damping band 102 comprises a lubricated plastic such as nylon, PA and PPA, and their equivalents.

Figure 2:
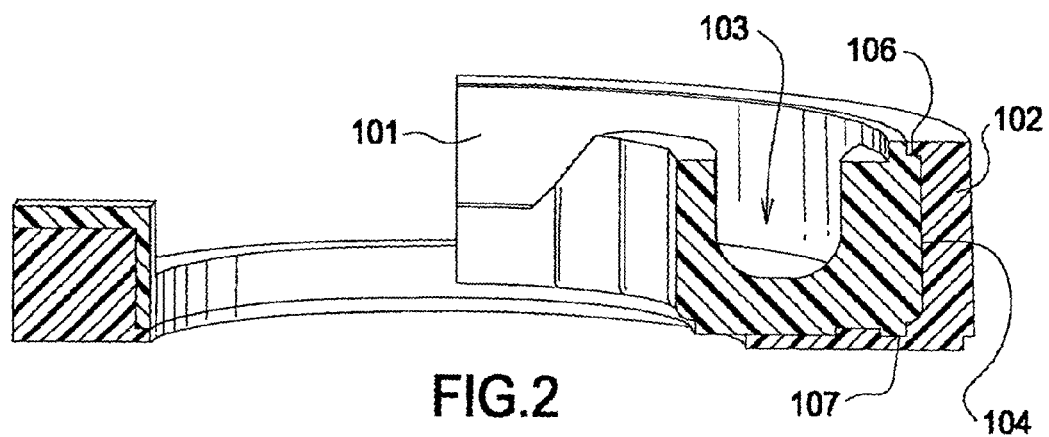
FIG. 2 is a cross-section view of an inventive damping mechanism at line 2—2 in FIG. 1.

FIG. 2 is a cross-section view of an inventive damping mechanism at line 2—2 in FIG. 1. Ring cut 106 extends about an outer perimeter of outer arcuate surface 104. Rim or protrusion 107 extends about a partial circumference of damping shoe 101. Ring cut 106 in combination with protrusion 107 serve to mechanically attach damping band 102 to damping shoe 101.

Figure 3:
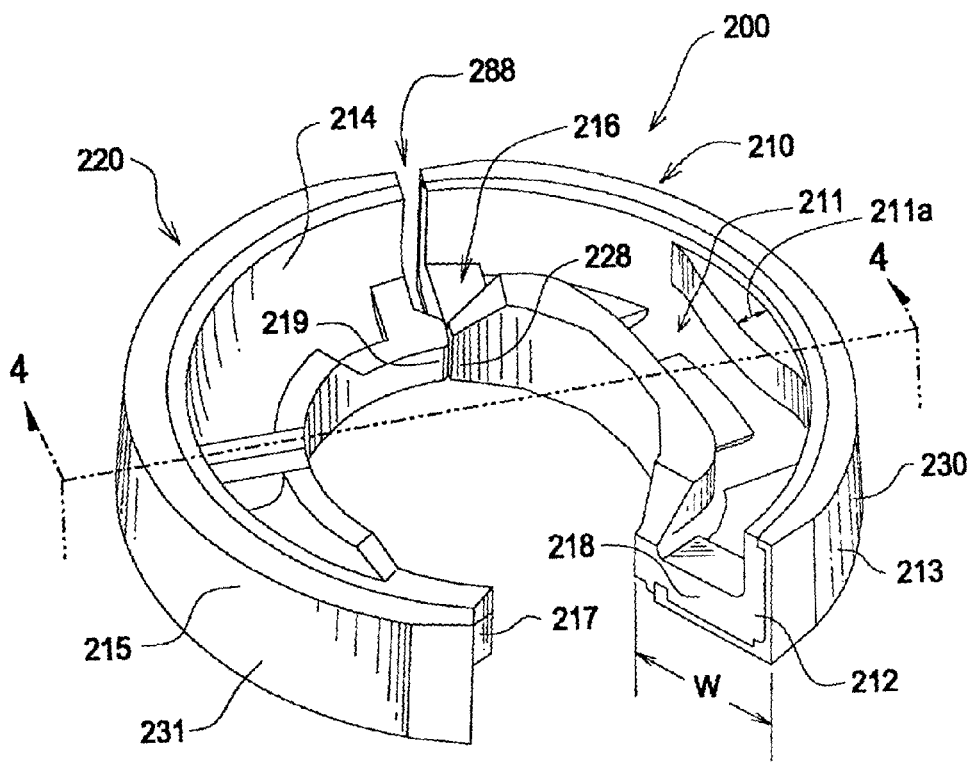
FIG. 3 is a top perspective view of an inventive damping mechanism.

FIG. 3 is a top perspective view of an alternate damping mechanism. Inventive damping mechanism 200 comprises a first arcuate member 210 and a second arcuate member 220. First arcuate member 210 has a spring receiving portion 211 into which a spring end tang may be inserted, see FIG. 12. A wall of the spring receiving portion has maximum thickness 211a at the spring contact area. Wall 211a may be tapered from the contact area in one direction or in both directions as it extends in both directions. By comparison, a like wall of the previous art has uniform thickness.

First arcuate member 210 comprises a damping band 213 attached to a damping shoe 212. Second arcuate member 220 comprises a damping band 215 attached to a damping shoe 214.

First arcuate member 210 is in pivotal contact with the second arcuate member 220 at a point of contact 216. Point of contact 216 comprises end 228 of damping shoe 212 and end 219 of damping shoe 214. Point of contact 216 may vary from a minimum radius to a maximum radius across a width W of each damping shoe with respect to a lever arm axis of rotation R—R, see FIG. 11.

In order to achieve the desired asymmetric damping factor, point of contact 216 is located at a predetermined radial distance from a lever arm axis of rotation R—R. A minimum radius location for point of contact 216, shown in FIG. 3, results in the highest asymmetric damping factor for the damping mechanism in operation in a tensioner. Point of contact 216 may be disposed at an outer radius 288 which produces a reduced asymmetric damping factor as compared to the foregoing minimum radius location.

In an alternate arrangement, end 218 of first arcuate member 210 is in contact with the second arcuate member end 217. In this alternate embodiment, a spring (not shown) having a coil direction opposite that used for the embodiment in FIG. 3 is used. Therefore, by switching the point of contact from one end of the first arcuate member and second arcuate member to another end, either a left hand or right hand spring can be used.

Damping band 213, 215 are made of frictional material such as plastics, phenolics and metallics. A working surface 230, 231 of damping band 213, 215 respectively is slideably engaged under pressure with a tensioner base or arm by operation of a spring, see FIG. 12 and FIG. 15. A frictional damping force is generated when the damping band slides on the base or arm.

Damping shoes 212, 213 are each made of structural material such as steel, molded plastic or equivalents thereof. Each damping shoe can be manufactured by utilizing a powder metal process, a die cast process, injection molding or similar processes. Materials that can be used include steel, aluminum (for low load parts), thermoplastics with various fillers, and equivalents thereof.

Damping band 215 of the second arcuate member has a material thickness less than the damping band 213 of the second portion. This has two advantages, first, increased spring hook-up size can be realized therefore a larger spring can be used. Second, due to the fact of that the second portion 220 of the damping mechanism has higher load than the first portion 210, a reduced thickness of the first damping band 213 will equalize durability life of both parts.

Figure 4:
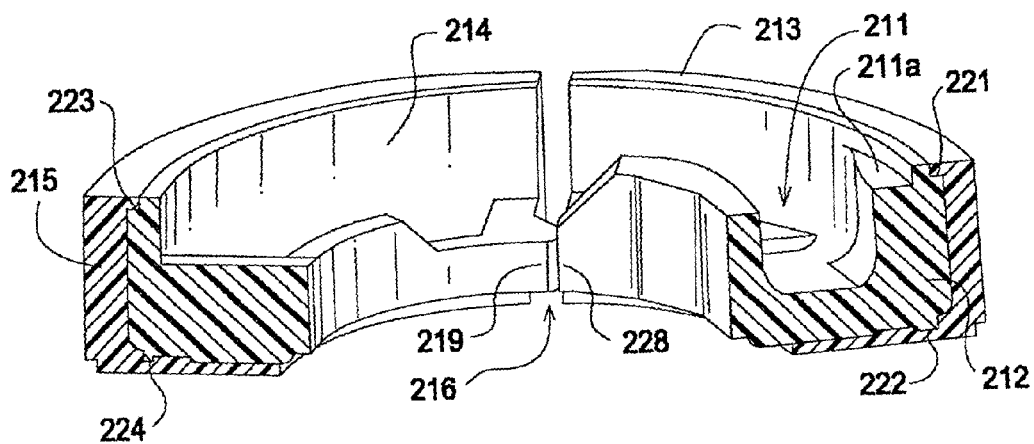
FIG. 4 is a cross-section view of an inventive damping mechanism at line 4—4 in FIG. 3.

FIG. 4 is a cross-section view of an alternate damping mechanism at line 4—4 in FIG. 3. Ring cut 221 extends about an outer perimeter of damping shoe 212. Protrusion 222 extends about a partial circumference of damping shoe 212. Ring cut 223 extends about an outer perimeter of damping shoe 214. Protrusion 224 extends about a partial circumference of damping shoe 214. Each ring cut 221, 223 in combination with each protrusion 222, 224 serve to mechanically attached each damping band 213, 215 to each damping shoe 212, 214 respectively.

Figure 5:
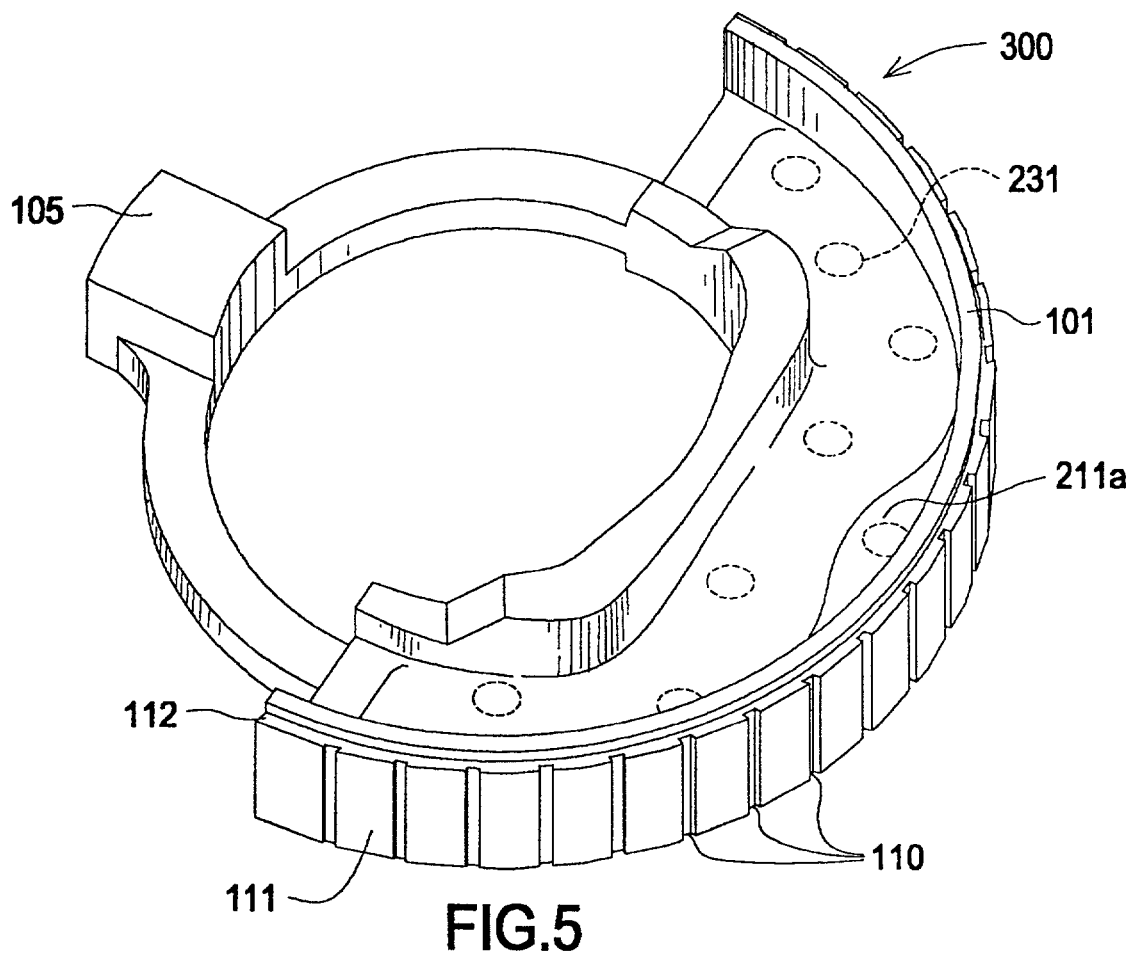
FIG. 5 is a top perspective view of a locking mechanism on the damping shoe of an inventive damping mechanism.

FIG. 5 is a top perspective view of a locking mechanism on the damping shoe of an inventive damping mechanism. Locking mechanism 300 joins damping shoe 101 to damping band 102, see FIG. 6. Locking mechanism 300 comprises a plurality of vertical grooves 110 on an arcuate outer engaging surface 111 of damping shoe 101. Ring cut 112 is included to a top edge of the arcuate outer surface 111 to enhance the interconnection of the damping band 102 to the damping shoe 101. Accordingly, lip portion 227 on damping band 102 engages over ring cut 112. The disclosed multiple groove locking mechanism provides an improved, strong and uniform connection between the damping shoe and damping band. The connection distributes a frictional load imparted to the damping band 102 during operation, thereby extending an operational life over the prior art.

Figure 6:
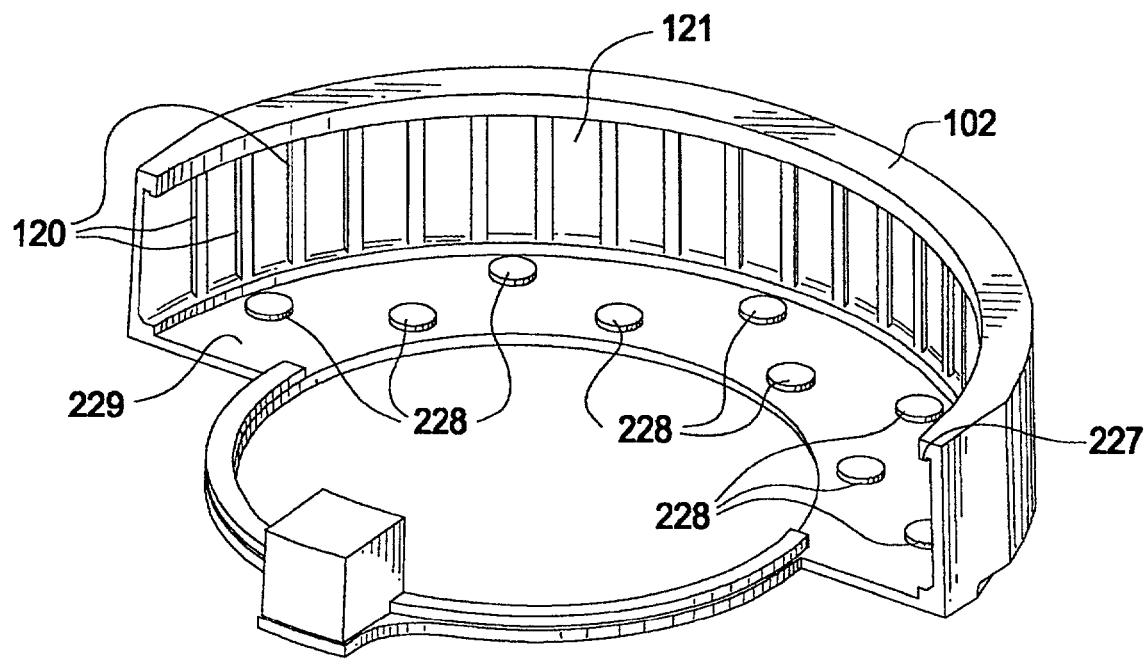
FIG. 6 is a top perspective view of a locking mechanism on the damping band of an inventive damping mechanism.

FIG. 6 is a top perspective view of a locking mechanism on the damping band of an inventive damping mechanism. The damping band portion of locking mechanism 300 comprises a plurality of spaced vertical ribs 120 on an arcuate inner engaging surface 121 of damping band 102. Ribs 120 of damping band 102 cooperatively engage grooves 110 of damping shoe 101. Protrusions 228 extend from a lower portion 229 of damping band 102. Protrusions 228 engage cooperating recesses or dimples 231 in a base of damping shoe 101 to further affix damping band 102.

The inventive locking mechanism significantly reduces weakening of the damping shoe, therefore, the inventive damping mechanism is much stronger than those in prior art. Loading conditions on the damping shoe/damping band are also much improved due to an improved load distribution across the damping shoe realized by the force distributive nature of the locking mechanism.

Figure 7:
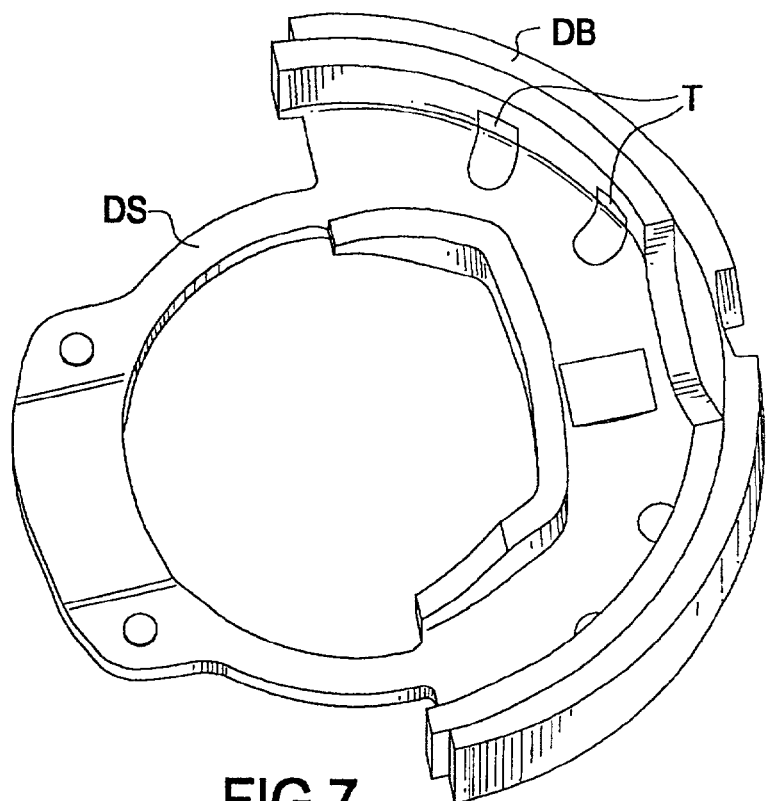
FIG. 7 is a top perspective view of a prior art damping mechanism.

FIG. 7 is a top perspective view of a prior art damping mechanism. Prior art damping band DB is connected to prior art damping shoe DS. Tabs T mechanically connect the damping band DB, see FIG. 9, to the damping shoe DS, see FIG. 8.

Figure 8:
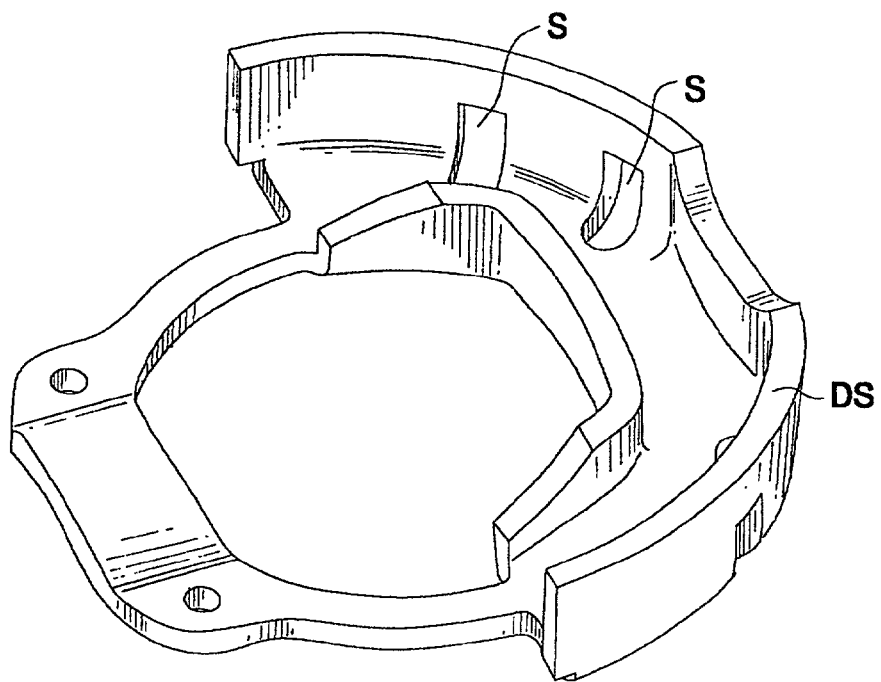
FIG. 8 is a top perspective view of a prior art damping mechanism damping shoe.

FIG. 8 is a top perspective view of a prior art damping mechanism damping shoe. Damping shoe DS comprises slots S. Slots S receive tabs T in order to mechanically connect damping band DB to damping shoe DS, see FIG. 9.

Figure 9:
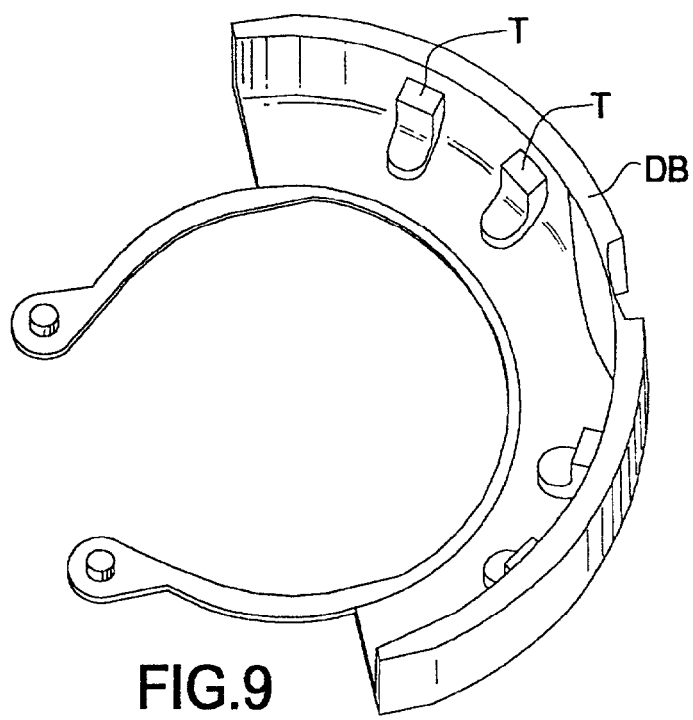
FIG. 9 is a top perspective view of a prior art damping mechanism damping band.

FIG. 9 is a top perspective view of a prior art damping mechanism damping band. Damping band DB comprises tabs T. Each of tabs T mechanically cooperate with corresponding slots S in order to connect damping band DB to damping shoe DS.

Figure 10:
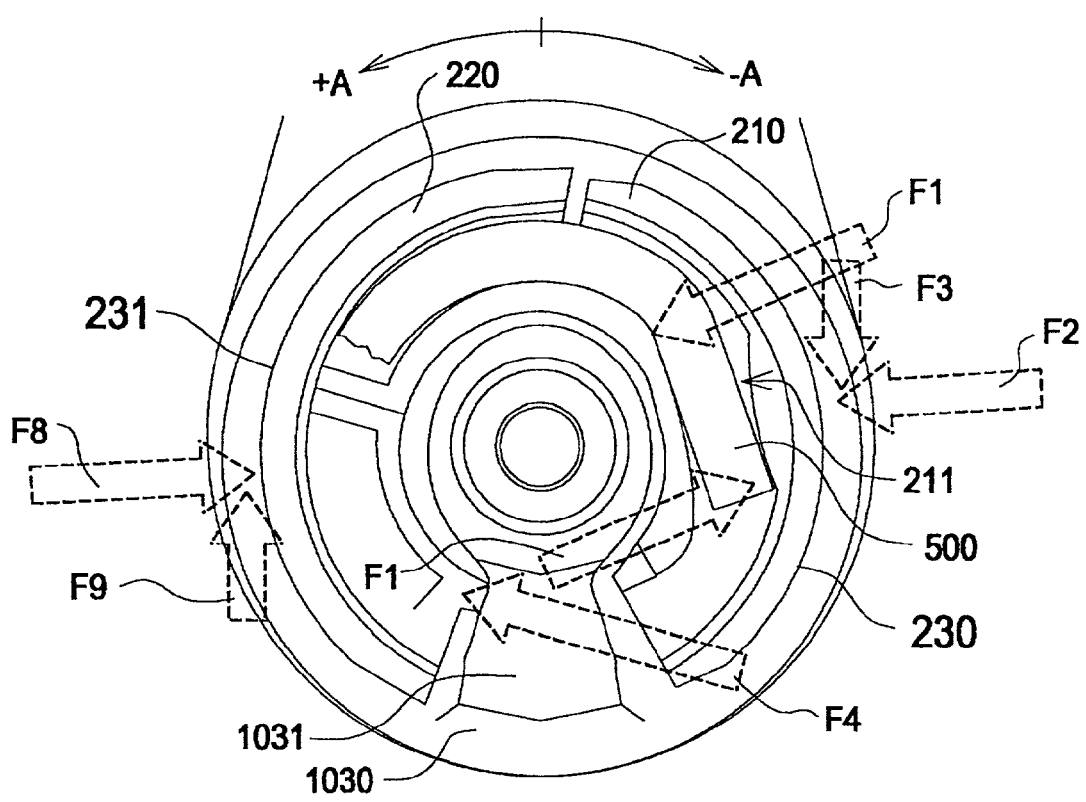
FIG. 10 is a diagram of forces acting on a damping mechanism.

FIG. 10 is a diagram of forces acting on a damping mechanism. The damping mechanism depicted is the embodiment described in FIG. 3 and FIG. 4. Forces F1 are spring contact reaction forces caused by contact of spring end 500 with the spring receiving portion 211. Spring end 500 contacts the spring receiving portion 211 at two points, creating a pair of reaction forces F1. F2 is a normal reaction force on the damping surface 230. F3 is a tangent friction force on the damping surface 230. F8 is a normal reaction force on the damping surface 231. F9 is a tangent friction force on the damping surface 231. F4 is the normal reaction force on damping mechanism arcuate member 220 imparted by a contact of damping shoe 214 with a lever arm 1030, see FIG. 16.

The asymmetric damping factor is a function of a difference in frictional forces F3 and F9 for a movement of the lever arm 1030. In operation, a normal reaction force F8 on damping surface 231 is larger than normal reaction force F2 on damping surface 230. More particularly, when the lever arm 1030 moves in the +A direction the vectors for the friction forces, F3 and F9 operate as shown in FIG. 10. As the lever arm moves in a direction −A, friction force vectors F3 and F9 reverse direction. The change of direction of frictional force vectors F3 and F9 causes a resultant force on each damping surface 230, 231 to change. As a result, when lever arm moves in the −A direction, a normal reaction force on damping mechanism F4 is larger than when the lever arm moves in direction +A. Proportionally, the torque generated on the lever arm in reference to the lever arm axis of rotation R—R by the force F4 is larger when the lever arm moves in the −A direction than when the lever arm moves in the direction +A. The value of the torque on the lever arm when the arm moves in the direction −A is larger than the value of torque generated by the pair of forces F1. The difference between the two values of torque is defined as the damping torque in the direction −A. The value of the torque on the lever arm when the arm moves in the direction +A is smaller than the value of torque generated by the pair of forces F1. The difference between the two values of torque is defined as the damping torque in the direction +A. The ratio between the value of the damping torque in the direction −A and the value of the damping torque in the direction +A represents the asymmetric damping factor.

The asymmetric damping factor is adjustable depending upon the radial location of point of contact 216 described in FIG. 3 and FIG. 4. The asymmetric damping factor will be increased as the point of contact 216 is placed radially closer to an axis of rotation of the lever arm 1030. In the alternative, the asymmetric damping factor will be decreased as the point of contact 216 is placed radially farther from an axis of rotation of the lever arm 1030. By radially moving point of contact 216 the asymmetric damping factor can be varied in the range of approximately 1.5 to 5.

Figure 11:
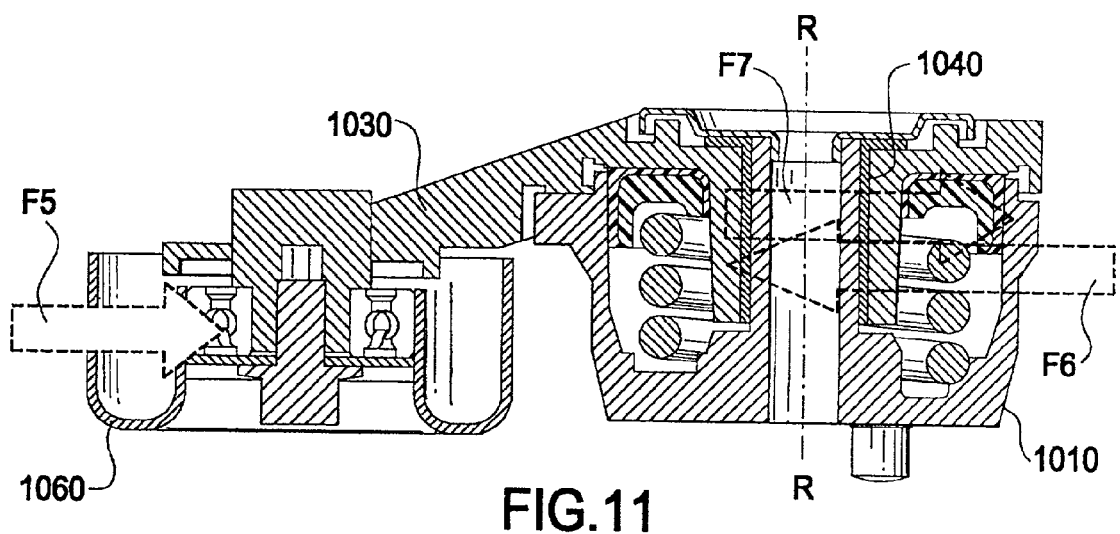
FIG. 11 is a cross-sectional view of forces acting on a tensioner at line 11—11 in FIG. 12.
Figure 12:
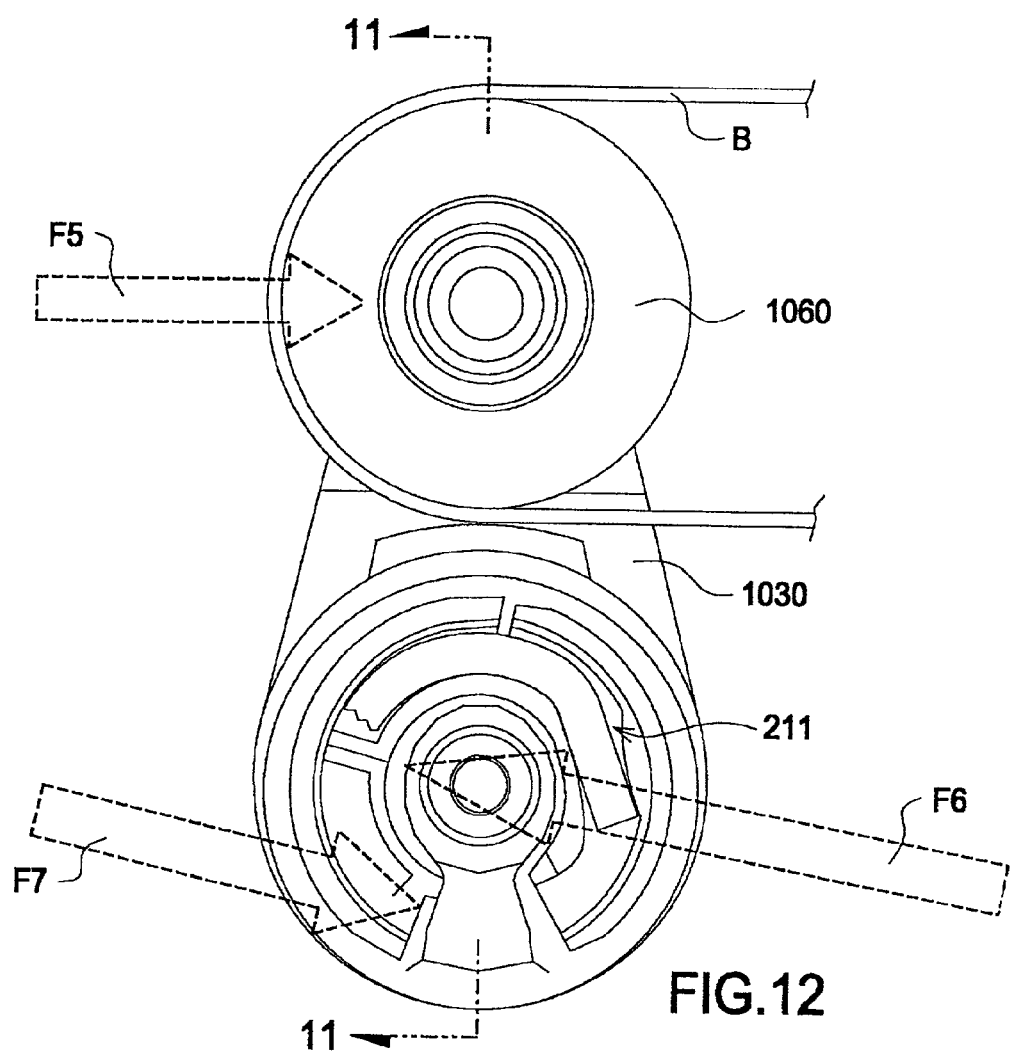
FIG. 12 is a plan view of forces acting on a tensioner.

FIG. 11 is a cross-sectional view of forces acting on a tensioner at line 11—11 in FIG. 12. Force F7 is a normal reaction force acting on the arm at the damping mechanism contact point. Force F7 has the same magnitude as force F4 acting on the damping mechanism. F6 is a pivot bushing reaction force acting at the interface between bushing 1040 and lever arm 1030. F5 is a hub load caused by a load on a belt B, see FIG. 12.

FIG. 12 is a plan view of forces acting on a tensioner. Depicted in FIG. 12 is a plan view of the forces described in FIG. 11.

Figure 13:
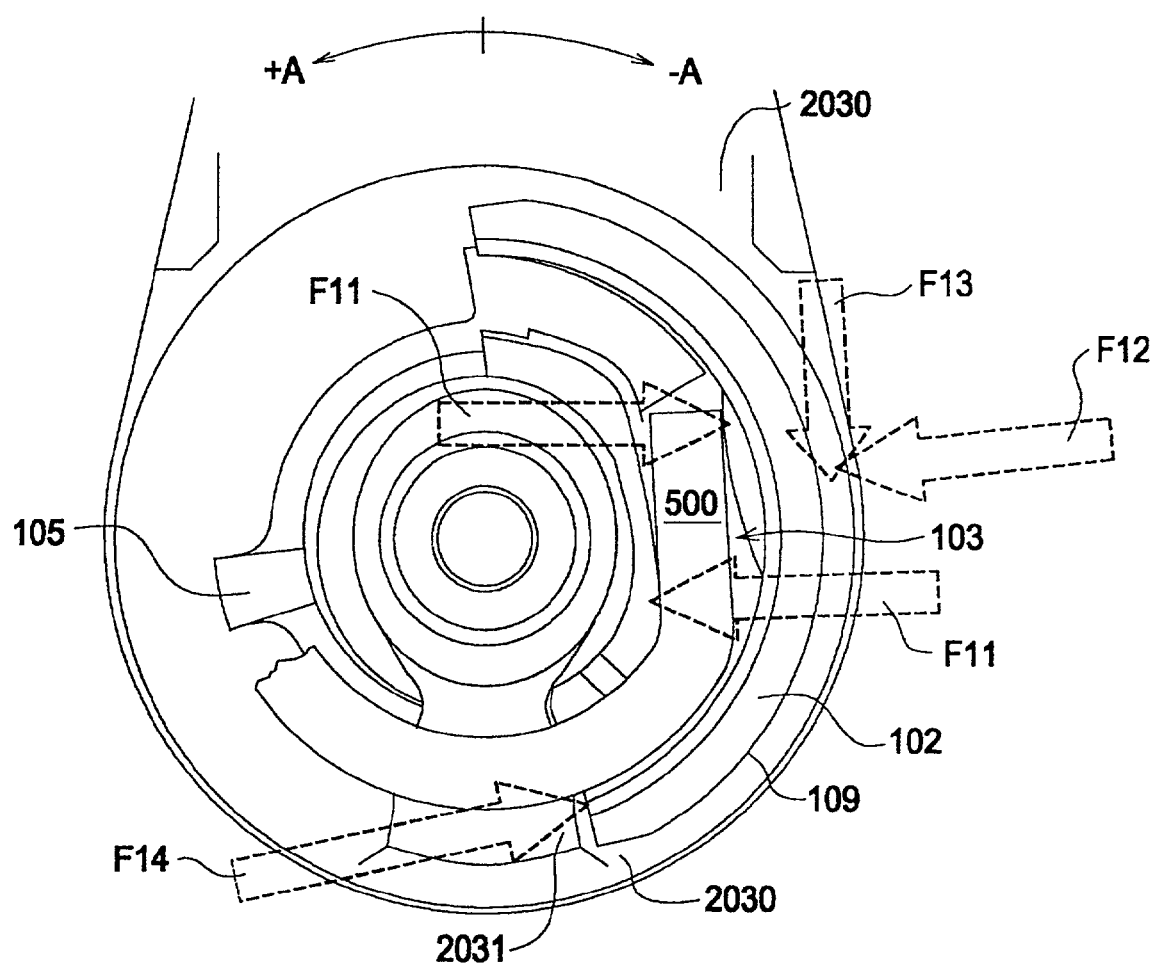
FIG. 13 is a diagram of forces acting on a damping mechanism.

FIG. 13 is a diagram of the forces acting on a damping mechanism. The damping mechanism is that depicted in FIG. 1 and FIG. 2. Forces F11 are spring contact reaction forces caused by contact of the end 500 with the spring receiving portion 103. One can see that spring end 500 contacts the spring receiving portion at two points creating a pair of reaction forces F11. F12 is a normal reaction force on the damping surface 109. F13 is a tangent friction force on the damping surface 109. F14 is the reaction force on damping mechanism portion 102 imparted by a contact with a lever arm 2030, see FIG. 17.

The asymmetric damping factor is realized by a difference in frictional force F13 for a movement of the lever arm 2030. More particularly, when lever arm 2030 moves in the +A direction, F13 operates as shown in FIG. 13. As the lever arm moves in the −A direction, F13 operates in the reverse direction. The change in direction in F13 causes a resultant force on damping surface 109 to change. As a result when lever arm 2030 moves in the +A direction, a force F14 on the damping mechanism is larger than when the lever arm moves in direction −A. Proportionally, the torque generated on the lever arm in reference to the lever arm axis of rotation R—R by the force F14 is larger when the lever arm moves in the +A direction than when the lever arm moves in the direction −A. The value of the torque on the lever arm when the arm moves in the direction +A is larger than the value of torque generated by the pair of spring forces F11. The difference between the two values of torque is defined as the damping torque in the direction +A. The value of the torque on the lever arm when the arm moves in the direction −A is smaller than the value of torque generated by the pair of spring forces F11. The difference between the two values of torque is defined as the damping torque in the direction −A. The ratio between the value of the damping torque in the direction +A and the value of the damping torque in the direction −A represents the asymmetric damping factor.

Figure 14:
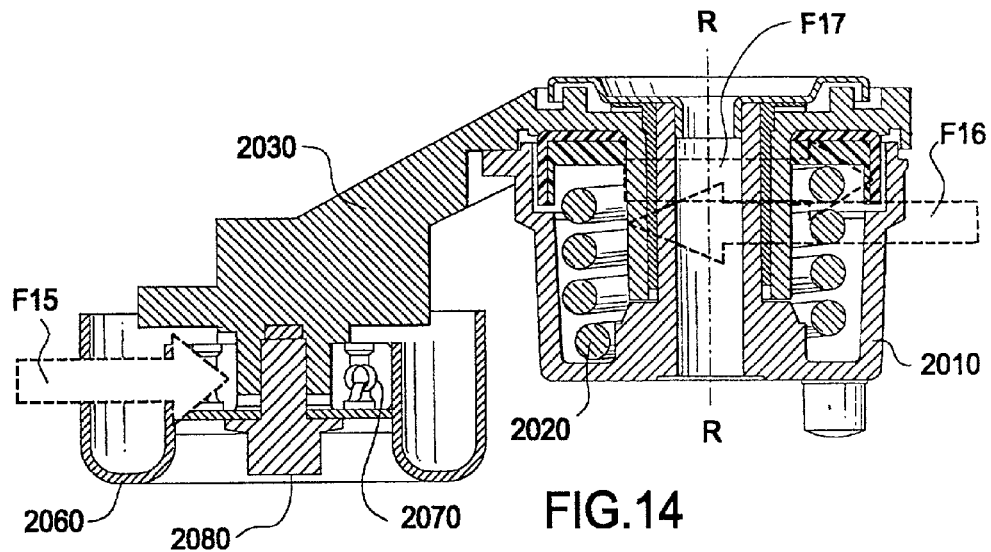
FIG. 14 is a cross-sectional view of forces acting on a tensioner at line 14—14 in FIG. 15.
Figure 15:
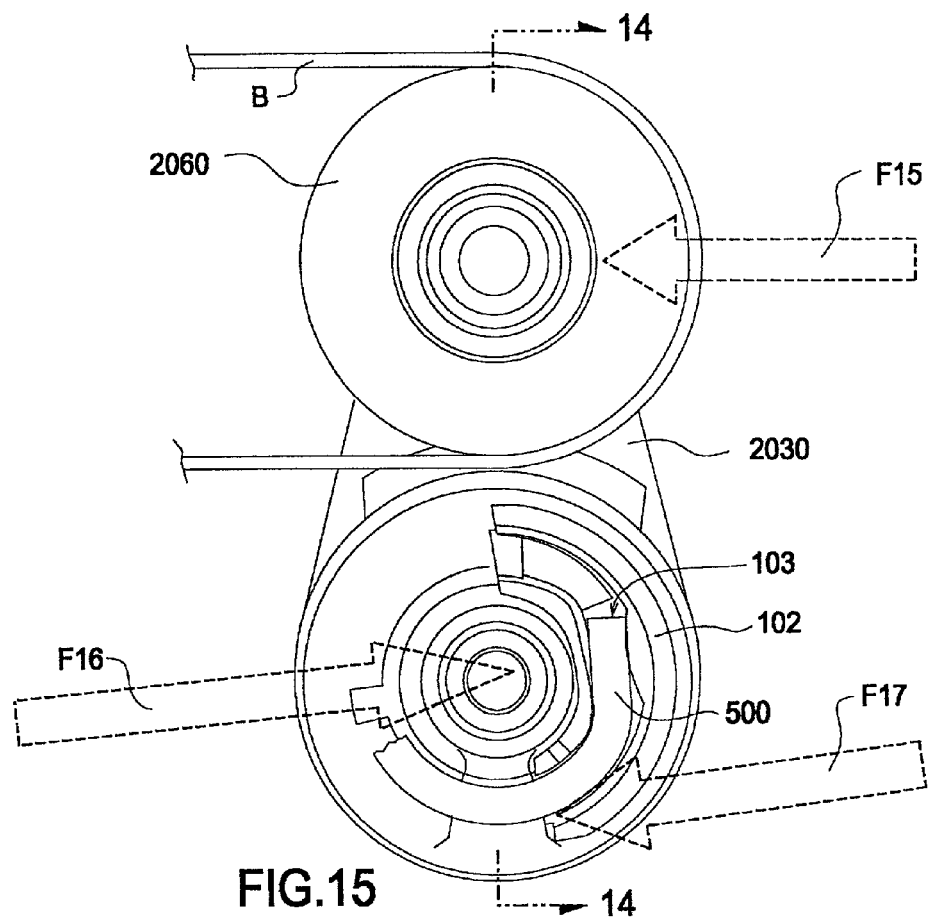
FIG. 15 is a plan view of forces acting on a tensioner.

FIG. 14 is a cross-sectional view of forces acting on a tensioner at line 14—14 in FIG. 15. Force F17 is a normal reaction force acting on the damping mechanism contact point. F16 is a pivot bushing reaction force acting at the interface between bushing 1040 and lever arm 1030. F15 is a hub load caused by a load on a belt B.

FIG. 15 is a plan view of the forces acting on a tensioner. Depicted in FIG. 15 is a plan view of the forces described in FIG. 14.

Figure 16:
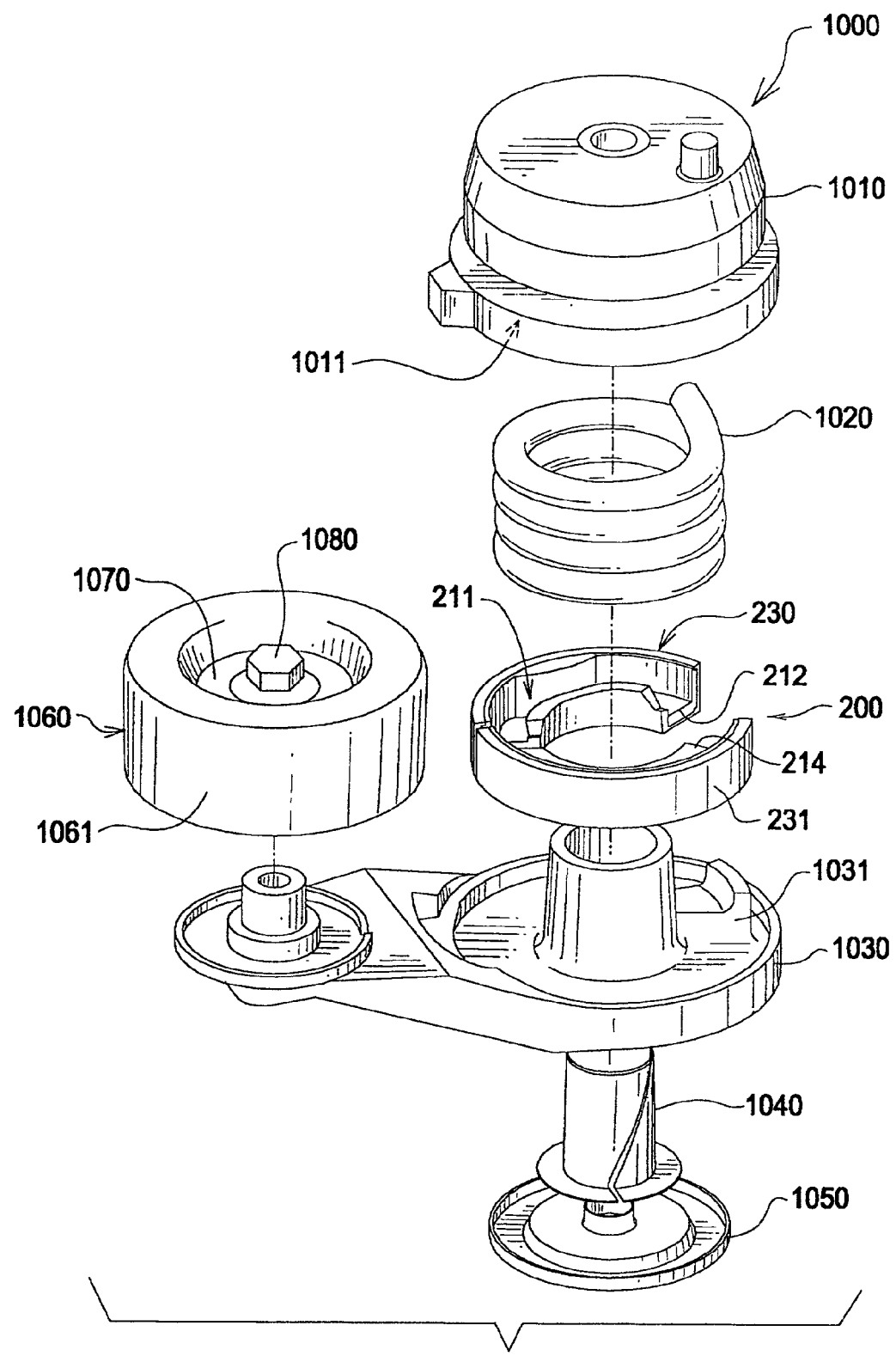
FIG. 16 is an exploded view of a tensioner having a damping mechanism.

FIG. 16 is an exploded view of a tensioner having a damping mechanism. Damping mechanism 200 engages lever arm 1030 at tab 1031. Biasing member or spring 1020 has one end connected to base 1010 and the other end connected to damping mechanism spring receiving portion 211 as described elsewhere in this specification. Lever arm 1030 is pivotably connected to base 1010 through bushing 1040. Dust seal 1050 prevents foreign material from entering the tensioner during operation. Pulley 1060 is journaled to lever arm 1030 through bearing 1070. A belt (not shown) engages pulley surface 1061.

Bearing 1070 is connected by a fastener such as bolt 1080. Damping mechanism surfaces 230, 231 are in sliding engagement with an inner surface 1011 of tensioner base 1010.

Tab 1031 engages damping shoe 212 during operation, thereby causing a movement of base inner surface 1011 across damping mechanism surface 230.

Figure 17:
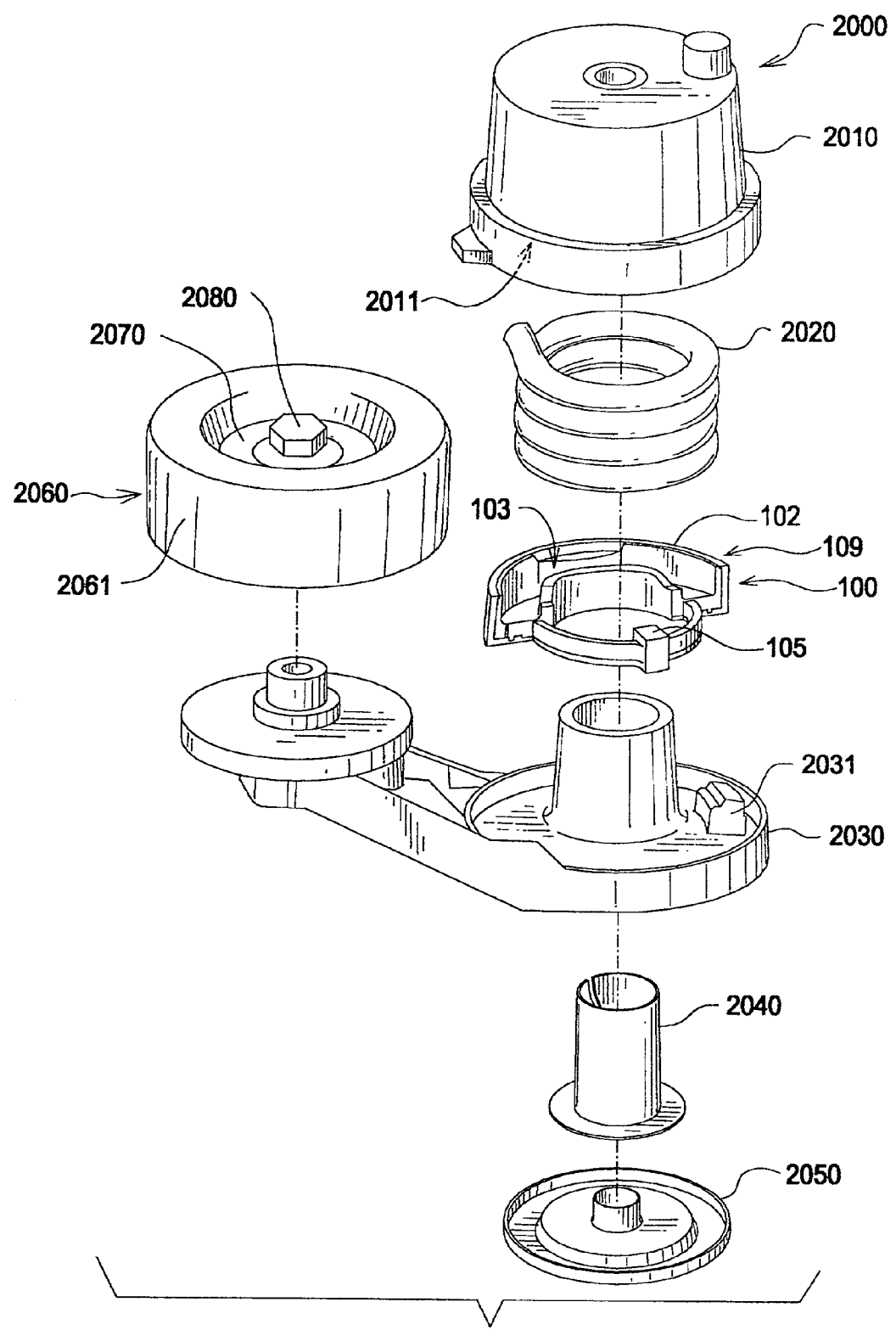
FIG. 17 is an exploded view of a tensioner having a damping mechanism.

FIG. 17 is an exploded view of a tensioner having a damping mechanism. Damping mechanism 100 is engaged with lever arm 2030 at tab 2031. Biasing member or spring 2020 has one end connected to base 2010 and the other end connected to damping mechanism spring receiving portion 103 as described elsewhere in this specification. Lever arm 2030 is pivotably connected to base 2010 through bushing 2040. Dust seal 2050 prevents foreign material from entering the tensioner during operation. Pulley 2060 is journaled to lever arm 2030 through bearing 2070. A belt (not shown) engages pulley surface 2061.

Bearing 2070 is connected by a fastener such as bolt 2080. Damping mechanism surface 109 is in sliding engagement with an inner surface 2011 of tensioner base 2010.

Tab 2031 engages damping mechanism 100 during operation, thereby causing a movement of base inner surface 2011 across damping mechanism surface 109.

Although a single form of the invention has been described herein, it will be obvious to those skilled in the art that variations may be made in the construction and relation of parts without departing from the spirit and scope of the invention described herein.

We claim:
1. A damping mechanism comprising:
a damping shoe having an arcuate form;
a damping band engaged with the damping shoe by a locking mechanism comprising a groove and cooperating rib, the locking mechanism opposing a frictional force imparted to the damping band during operation;
a protrusion extending from the damping band for engaging a cooperating recess in the damping shoe;
a lip in the damping band for engaging the damping shoe;
the damping shoe comprising a surface for supporting a spring coil; and the damping shoe comprising a spring receiving portion having two spring contact points for contacting a spring.

2. The damping mechanism as in claim 1 further comprising:
- a second damping shoe having an arcuate form;
- a second damping band engaged with the second damping shoe by a second locking mechanism, the second locking mechanism disposed to opposed a frictional force imparted to the second damping band during operation.

3. The damping mechanism as in claim 2 further comprising:
- a protrusion extending from the second damping band for engaging a cooperating recess in the second damping shoe.

4. The damping mechanism as in claim 2 further comprising:
- a lip in the second damping band for engaging the second damping shoe.

5. The damping mechanism as in claim 2 further comprising:
- the damping shoe engaged with the second damping shoe at a point of contact;
- the point of contact disposed a radial distance from a lever arm axis of rotation whereby an asymmetric damping factor is achieved.

6. The damping mechanism as in claim 5, wherein the asymmetric damping factor is in the range of approximately 1.5 to 5.

7. The damping mechanism as in claim 2, wherein the locking mechanism comprises a groove and cooperating rib.

8. A tensioner comprising;
- a base;
- a lever arm pivotally engaged to the base;
- a pulley journalled to the lever arm;
- a damping mechanism engaged with the lever arm and frictionally engaged with the base;
- the damping mechanism comprises a damping shoe engaged with damping band by a groove on an engagement surface, the groove oriented to opposed a frictional force imparted to the damping band during operation;
- a spring engaged with the damping shoe and the base;
- the damping shoe comprising a spring receiving portion having two spring contact points for contacting a spring end whereby a pair of reaction forces are created;
- a protrusion extending from the damping band for engaging a cooperating recess in the damping shoe; and
- the damping mechanism having an asymmetric damping factor.

9. The tensioner as in claim 8, wherein the damping mechanism further comprises:
- a lip in the damping band for engaging the damping shoe.

* * * * *